United States Patent [19]

Kerr

[11] 3,979,111

[45] Sept. 7, 1976

[54] OUTBOARD MOTOR REPAIR STAND WITH LOCKABLE WORM GEAR SHAFT

[76] Inventor: Robert M. Kerr, P.O. Box 1135, Winter Garden, Fla. 32787

[22] Filed: Aug. 4, 1975

[21] Appl. No.: 601,289

Related U.S. Application Data

[63] Continuation-in-part of Ser. No. 289,367, Sept. 15, 1972.

[52] U.S. Cl. .................................... 269/76; 269/71

[51] Int. Cl.[2] ........................ B23Q 1/12; B25B 1/22

[58] Field of Search ................... 269/17, 55, 58, 59, 269/61, 73, 78, 71, 63, 69, 72, 76

[56] References Cited

UNITED STATES PATENTS 3,355,162 11/1967 Kerr .................................... 269/71

FOREIGN PATENTS OR APPLICATIONS 749,610 5/1956 United Kingdom .................. 269/71

*Primary Examiner*—Roy Lake
*Assistant Examiner*—E. F. Desmond
*Attorney, Agent, or Firm*—Robert G. McMorrow

[57] ABSTRACT

An outboard motor repair stand has a base with a vertical standard assembly of variable height. At the upper end of the standard a main cross shaft has an offset bar fixed to one end, and a worm gear assembly at the opposite end. A saddle is secured to the offset bar in such manner that a heavy motor or the like attached thereto serves to counterbalance the assembly in co-operation with the mechanical advantage of the worm gear assembly. The handle for the worm gear assembly is located above the housing.

The gear shaft has a releasable lock mechanism thereon.

1 Claim, 6 Drawing Figures

FIG. 5
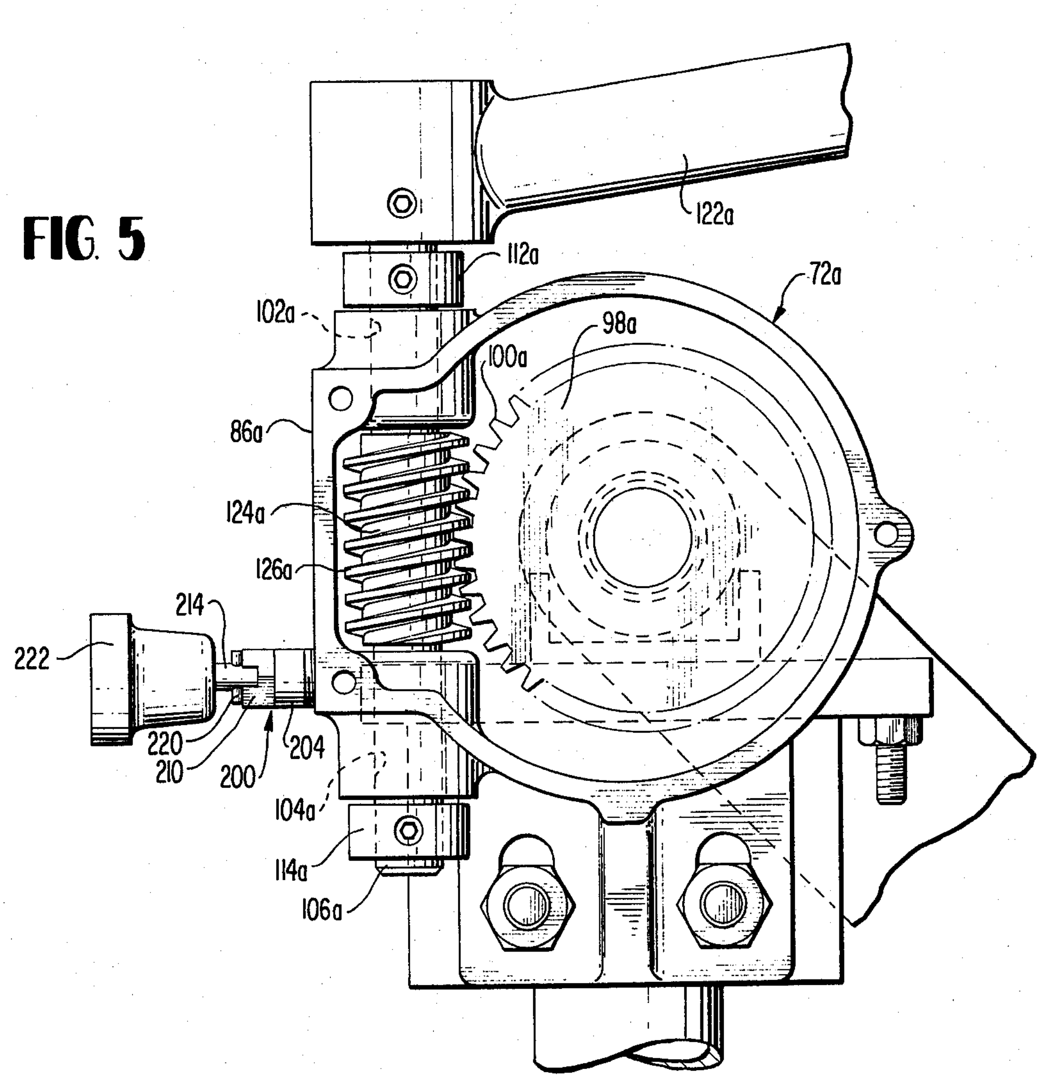
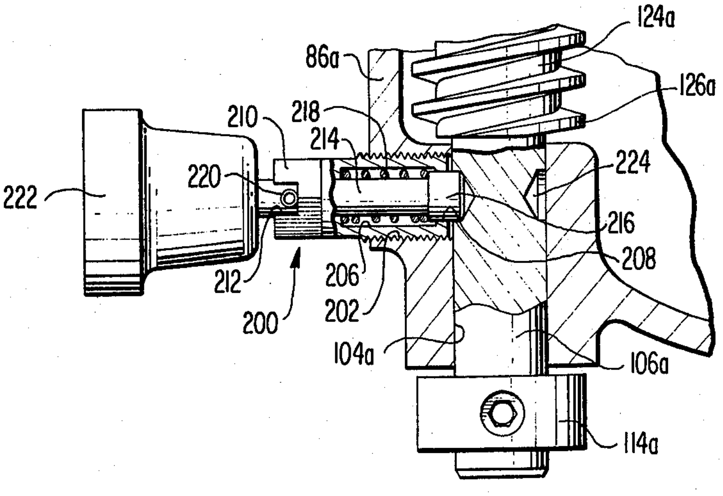
FIG. 6

OUTBOARD MOTOR REPAIR STAND WITH LOCKABLE WORM GEAR SHAFT

Cross-Reference to Related Application

This application is a Continuation-In-Part of application Ser. No. 289,367 filed Sept. 15, 1972.

BACKGROUND OF THE INVENTION:

1. Field of the Invention:

This invention relates to repair and service stands employed in the servicing of outboard motors and similar devices.

2. Statement of the Prior Art:

The present invention pertains to specific improvements and modifications of the type of repair stands disclosed in my prior U.S. Pat. No. 3,355,162. Additional pertinent prior art references are as follows:

| U.S. Pat. No. | Patentee | Issue Date |
|---|---|---|
| 1,008,821 | Hathorn | Nov. 14, 1911 |
| 1,127,969 | Dolder | Feb. 9, 1915 |
| 1,481,503 | Carswell et al. | Jan. 22, 1924 |
| 1,812,585 | Collins | Jne. 30, 1931 |
| 2,318,791 | Mueller | May 11, 1943 |
| 2,445,016 | Bentley | Jly. 13, 1948 |
| 2,871,768 | Froberg | Feb. 3, 1959 |
| 2,913,241 | Miner | Nov. 17, 1959 |
| 3,172,653 | Fredrickson | Mar. 9, 1965 |
| British Patent No. 749,610 of May 30, 1956. | | |

SUMMARY OF THE INVENTION:

This invention relates to the provision of an outboard motor repair stand which effectively and positively positions an outboard motor in selected service position and effectively obviates the possibility of accidental or inadvertent displacement of the motor during repair or servicing. This provides a safety factor not achievable with prior devices of this general type. In the present arrangement, the position of the motor is selected through the use of a worm gear assembly, the control for which is positioned such that the operator may rotate the motor from a work position to another position while continuing repair or service operations. Release of the control handle automatically locks the motor in that position until the handle is turned again. The unit further includes a safety lock feature to completely prevent accidental displacement of the motor during repair or servicing.

In addition to the safety factor provided by the foregoing, the efficiency of repair operations is enhanced. In prior art arrangements wherein the latching and unlatching of the lock or brake members or where a remote control for turning a gear system is involved in the control of the selected position, it was necessary for the operator to cease working on the engine in order to vary its location. This interferes with many maintenance operations, and effectively results in the requirement for two operators, one for operation of the stand and another for performance of maintenance on the motor. The present arrangement overcomes this by the unique positioning of the control handle means.

Other and further objects and advantages of the invention will become apparent to those skilled in the art from a consideration of the following specification when read in conjunction with the annexed drawings.

BRIEF DESCRIPTION OF THE DRAWINGS:

FIG. 5 is a view similar to FIG. 3, but showing the additional safety locking feature incorporated herein; and FIG. 6 is an enlarged view of the safety lock.

Figure 1:
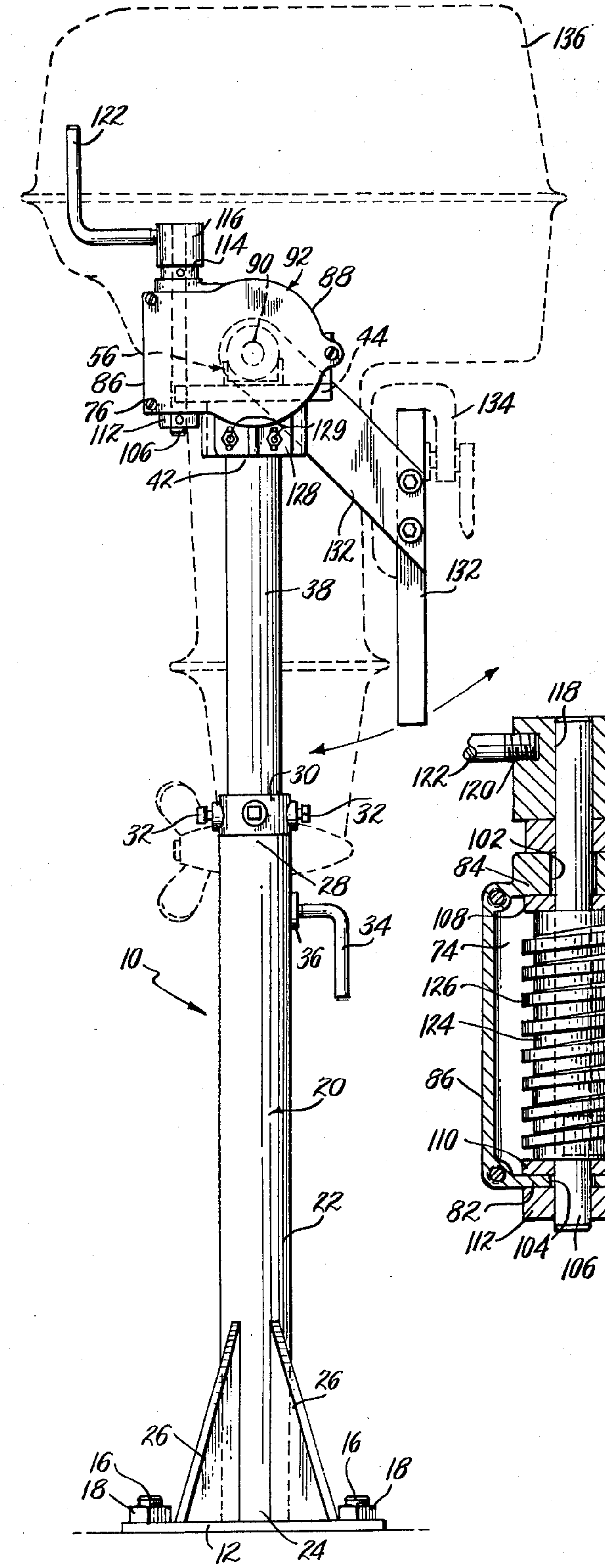
FIG. 1 is a side elevational view of the motor stand of the present invention.
Figure 3:
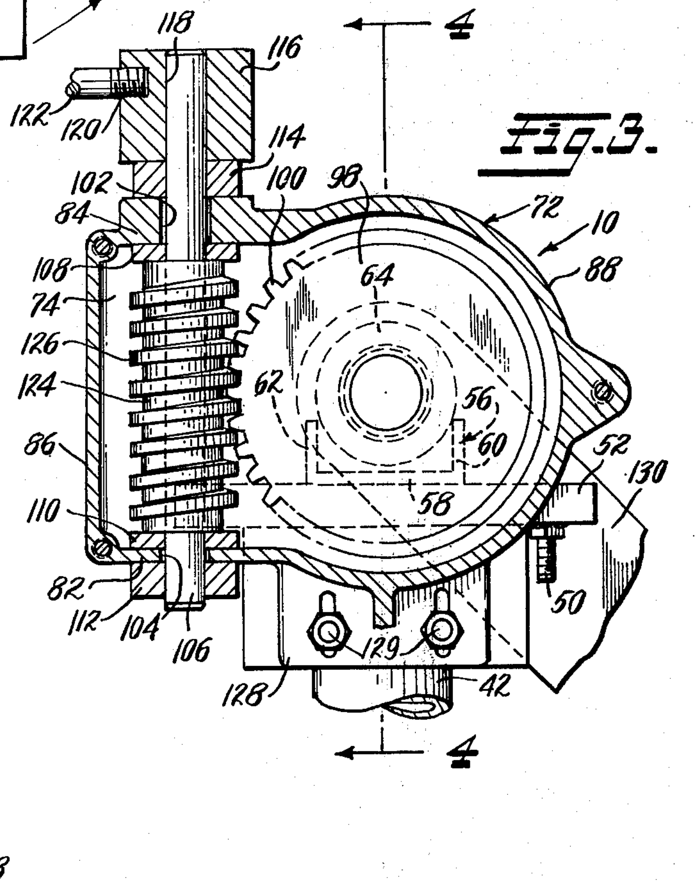
FIG. 3 is an enlarged fragmentary vertical sectional view taken on line 3 — 3 of FIG. 2.
Figure 2:
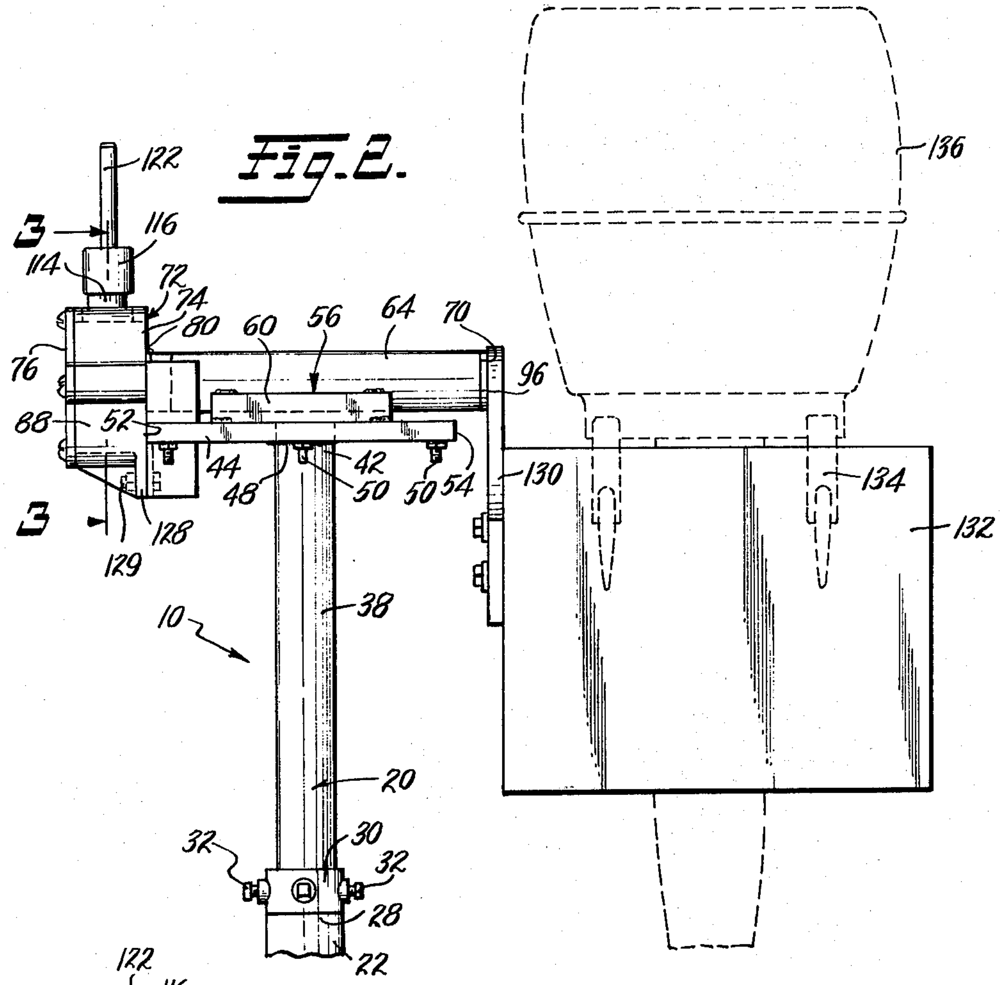
FIG. 2 is a fragmentary front elevational view of the motor stand as shown in FIG. 1.

DESCRIPTION OF THE PREFERRED EMBODIMENTS:

Referring to the drawings in more detail, the motor stand hereof is generally identified throughout the drawings by reference character 10. The stand 10 is primarily employed in establishments specializing in the servicing and repair of outboard motors, and is usually permanently mounted in a service area. Such mounting occurs through affixation of a base plate 12 to the floor 14. This is preferably accomplished by embedded mounting bolts 16 with associated nuts 18.

The stand comprises an upright standard assembly 20 having a lower standard element 22 fixed to the base plate at its lower end 24 and having a series of reinforcing gusset plates 26. The upper end 28 of the standard element 22 has a set collar 30 thereon with lock screws 32. A clamp 34 is threadedly engaged in a ring member 36 for inward and outward movement.

The standard further includes an upper stand component 38 which is telescopically received in the lower standard element 22 for vertical adjustment. The component 38 has a lower end portion engaged by the clamp 34 and has lock means 32. It further includes an opposite upper end 42.

A further important feature of the invention resides in an enlarged horizontal cross plate 44 which has a central opening 46 formed therein. The end of the standard component 38 is engaged in said opening and secured by welds 48, or the like. Hex head bolts 50 are fixed to the base of the plate, for attachment of other components and accessory items. The plate includes ends 52 and 54. Fixed to the top of the plate is a U-form channel member 56 which includes a horizontal bight portion 58 attached, as by welding, to the plate, and upstanding, spaced apart, confronting side arms 60, 62. The channel is of heavy metallic construction. Secured to the channel and dimensioned to fit between and be cradled in its side arms, thereby avoiding any possibility of displacement due to lateral pressure, is an elongated tube 64. The tube is of a length such that it projects outwardly of the ends of the plate, and the tube has a horizontal bore 66 which opens on its ends 68 and 70.

Figure 4:
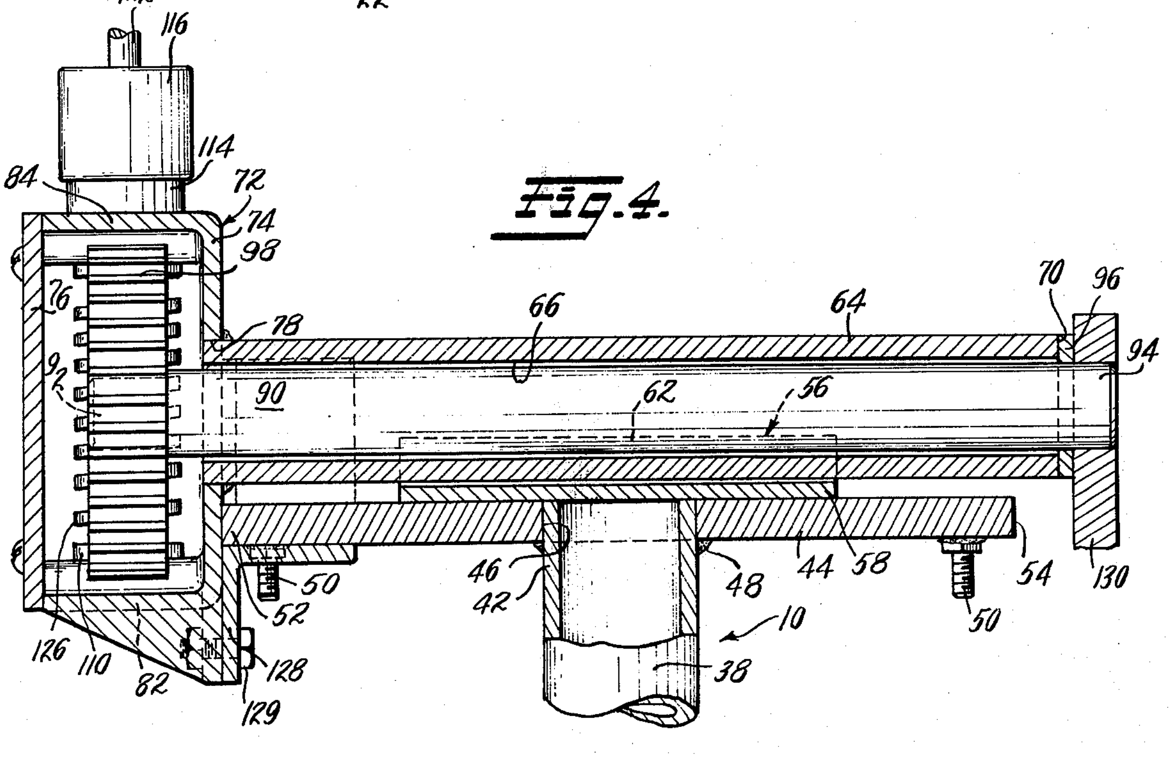
FIG. 4 is a fragmentary vertical sectional view, taken on line 4 — 4 of FIG. 3.

A gear housing 72, formed of cast aluminum or other suitable material, includes inner and outer side walls 74, 76 respectively. The inner wall has an opening formed therein at 78 (see FIG. 4) and the end 68 of the tube extends thereinto, being secured by welds 80. The housing further comprises base and top sections 82, 84 and end sections 86, 88.

Extending through the tube 64 and projecting outwardly of each of the ends thereof is an elongated, substantially cylindrical main shaft 90. One end 92 of the shaft extends into the housing 72 through the opening 78 therein, while the opposite end 94 extends outwardly of the tube end 70 through a bushing 96.

A worm wheel 98, having suitable worm gear teeth 100 is fixed to the shaft end 92 within the housing. At a spaced location the top and bottom sections of the housing have vertically co-aligned openings 102, 104 formed therein. A rotatable worm gear shaft 106 is journaled therein between the bearings 108, 110. The worm gear shaft has a lower retaining bushing 112 and an upper spacer 114. An enlarged head 116 has a bore 118 in which the shaft is tightly fixedly engaged, and has a threaded hole 120 in which a crank handle 122 is secured. A worm gear drive 124 having worm teeth 126 engaged with the gear teeth 98 is mounted on the worm gear shaft 106 for rotation therewith.

It will be observed that a bracket 128 reinforces the housing and effects connection thereof to the plate by means of the bolts 50 provided on the plate and by additional bolts 129.

At the end 94 of the shaft an offset bar element 130 is fixedly secured thereto in angular relation to the shaft. A mounting saddle 132 is secured to the distal extremity of the arm. The saddle is employed as a mounting means for the transom brackets 134 of an outboard motor 136, or like device to be serviced.

In FIGS. 5 and 6, the unit is modified to include a safety lock feature. Here, the housing 72*a* has a worm wheel 98*a*, with teeth 100*a*, which is fixed to the main shaft. The housing has a vertical worm gear shaft 106*a* extending through upper and lower shaft openings 102*a*, 104*a* formed therein, and the shaft is retained by bushings 112*a*, 114*a*. The gear drive 124*a* has teeth 126*a* operatively engaging the teeth 100*a* of the wheel. An operating crank 122*a* is used to turn the gears.

The safety lock is generally designated in the drawing by reference numeral 200. The end wall 86*a* of the housing has a threaded longitudinally extending bore 202 formed therein and extending therethrough. An externally threaded plug member 204 is engaged in the bore. The plug member has a central chamber 206, and an open inner end 208. The outer end 210 thereof also has an opening, and is diametrically slotted at 212. A shaft 214 extends through the plug member, and has an enlarged locking lug 216 which extends through the open inner end 208. A coil spring 218 within the chamber 206 exerts a constant bias against the lug to urge the same inwardly. The shaft 214 further has a lateral cross pin 220 dimensioned to seat in the slot 212. A handle 222 is secured to the outer end of the shaft 214.

In this form of the invention, as shown in FIG. 6, the gear shaft 106*a* is provided with means to receive the lug 216. Such means comprises diametrically opposite indents 224 which receive and grip the lug when it enters the same.

The shaft 214 is adapted for axial movement within the plug member, and is also rotatable through manipulation of the handle. When the handle is rotated to the position shown in FIG. 5, the cross pin seats against the end of the plug member, holding the lug in retracted position. Rotation of the shaft via the handle to permit the pin to occupy the slot 212 releases the lug to enter the next indent 224 encountered during rotation of the gear shaft. When so engaged, further rotation of the gear shaft is prevented until the lug is withdrawn.

In operation, with the motor secured on the saddle, its position is variable by operation of the crank 122 which, through the gear system, effectively rotates the main shaft 90 effecting in turn, full 360° rotation of the motor. The proximate location of the crank on the upper side of the housing facilitates one man operation, and the mechanical relationship between the weight of the motor and the gear system is such that whenever operation of the crank is ceased, the motor will remain in a present location. When particularly hazardous operations are under way, the lock means is activated.

I claim:

1. In a repair stand for an outboard motor or the like, of the type including a base, and a standard assembly of changeable height connected to the base: that improvement comprising:
 - a horizontal cross plate fixedly secured to the standard in perpendicular relation thereto and projecting outwardly at opposite sides thereof;
 - a U-form channel member, including a bight portion and confronting, spaced apart arms, the bight portion being secured to the cross plate with the arms extending outwardly;
 - an elongated tube fixedly mounted in the channel member between the arms, the tube having a horizontal bore therein, and the tube extending outwardly of the cross plate at each side thereof;
 - a gear housing having inner and outer side walls, the inner side wall having an opening therein, base and top sections and end sections fixedly secured to the tube and to the plate;
 - an elongated substantially cylindrical horizontal main shaft positioned in the tube for rotation therein and having opposite ends extending outwardly of the tube at each side thereof;
 - one end of the shaft extending into the gear housing through said opening in said inner side wall thereof;
 - a worm wheel fixed to the one end of the main shaft within said housing;
 - the base and top sections of the housing having vertically coaligned openings therein, and a rotatable worm gear shaft extending in vertical orientation through said openings;
 - a worm drive gear on said worm gear shaft within the housing in mesh with said worm wheel;
 - an actuating handle on the worm gear shaft adjacent the top section of the housing in an upper, readily accessible location;
 - a single offset bar element having one end affixed to the end of said main shaft protruding from said housing;
 - a mounting saddle fixedly secured to the distal end of said element, the mounting saddle being parallel to the shaft, and being rotatable with the shaft responsive to turning of the actuating handle in a 360° arc, the angle of the mounting saddle relative to the base being constantly altered by said rotation;
 - a safety lock assembly comprising a plug member engaged in an end section of the gear housing;
 - the plug member having a chamber therein;
 - a shaft extending through the plug member and having an enlarged locking lug thereon;
 - a coil spring within the chamber constantly urging the locking lug in the direction of the worm gear shaft;
 - a handle on the safety lock shaft;
 - means for retaining the safety lock shaft in retracted position; and
 - the worm gear shaft having means thereon engaged by the locking lug to prevent further rotation of the worm gear shaft.

* * * * *